(No Model.)
J. A. ASHBURN.
VENTILATOR.
No. 515,068.　　　　　　　　Patented Feb. 20, 1894.
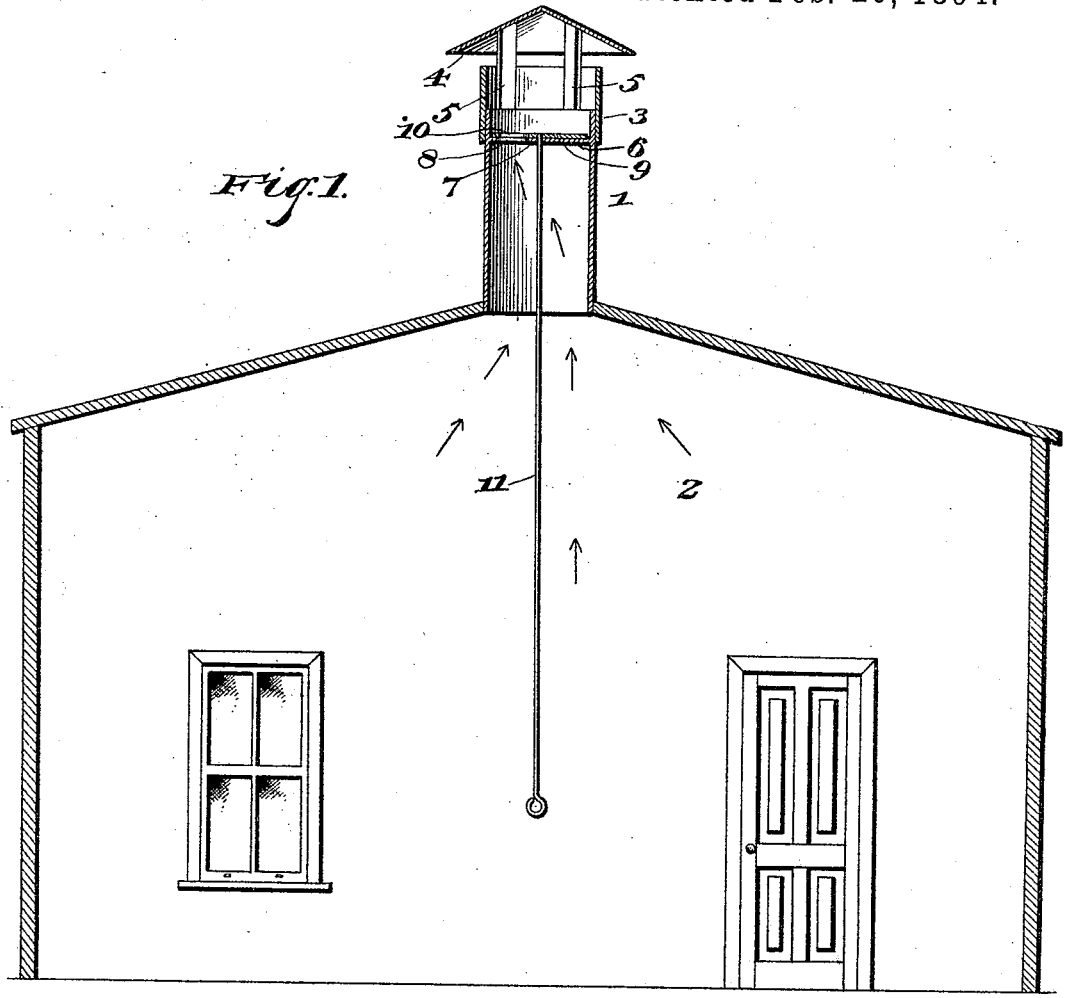
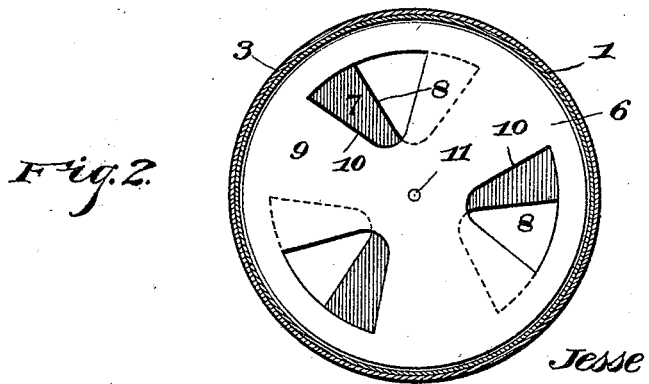
Inventor
Jesse A. Ashburn,
By his Attorneys.

UNITED STATES PATENT OFFICE.

JESSE A. ASHBURN, OF PILOT MOUNTAIN, NORTH CAROLINA, ASSIGNOR TO THE PILOT MOUNTAIN FLY EXCLUDER COMPANY, OF SAME PLACE.

VENTILATOR.

SPECIFICATION forming part of Letters Patent No. 515,068, dated February 20, 1894.

Application filed June 22, 1893. Serial No. 478,487. (No model.)

*To all whom it may concern:*

Be it known that I, JESSE A. ASHBURN, a citizen of the United States, residing at Pilot Mountain, in the county of Surry and State of North Carolina, have invented a new and useful Ventilator, of which the following is a specification.

The invention relates to improvements in ventilators.

The object of the present invention is to provide a combined ventilator and fly escape, which will be simple and comparatively inexpensive in construction, adapted to afford ventilation, and capable of excluding flies, and of causing the same to escape from a room.

The invention consists in the construction and novel combination and arrangement of parts hereinafter fully described, illustrated in the accompanying drawings and pointed out in the claim hereto appended.

In the drawings—Figure 1 is a vertical sectional view of a ventilator and fly escape constructed in accordance with this invention and shown applied to a building. Fig. 2 is a horizontal sectional view of the same.

Like numerals of reference indicate corresponding parts in all the figures of the drawings.

1 designates a vertically disposed tubular ventilator body, mounted above a room of a building or structure 2, and provided at its upper portion with a removable section 3, carrying a conical hood 4, which is supported above the removable section of the ventilator body by bars 5 to provide ventilator openings for the escape of hot air and gases from the house or structure 2.

The ventilator is adapted to afford an escape for flies, and when the room is darkened many of the flies which may be in the room seeing the light through the ventilator will pass out of the same providing the light admitted through the ventilator is not sufficient to light up the room to any great extent.

In order to enable the room, after the doors and windows thereof have been closed, to be darkened to the desired degree, a light regulator 6 is arranged within the ventilator. The light regulator consists of a fixed disk 7 secured within the body of the ventilator and provided with sector-shaped radially disposed openings 8, and a rotary disk 9, which is provided with openings 10, corresponding in shape to those of the fixed disk or plate, and adapted to register partially or completely therewith to regulate the size of the openings through which the light is admitted, to enable the room to be darkened to the desired extent. The rotary plate has secured to it a depending rod 11, which is journaled in a central opening of the fixed disk or plate; and the rod depends sufficiently within the room to be within easy reach to enable the light adjuster to be regulated. The light adjuster also enables the degree of ventilation to be regulated and controlled.

It will be seen that the combined ventilator and fly escape is simple and comparatively inexpensive in construction, and is adapted to cause the flies of a room to pass out.

Changes in the form, proportion and the minor details of construction may be resorted to without departing from the principle or sacrificing any of the advantages of this invention.

What I claim is—

The combination with a ventilator comprising a tubular body 1 designed to be mounted above a room, the removable section 3 arranged at the upper end of the body 1 and provided with upwardly extending supporting bars 5, and a conical hood arranged above the removable section 3 and secured to the supporting bars, a disk arranged within the body of the ventilator and forming a horizontal partition and provided with openings to permit the entrance of light, a rotary plate mounted on the disk and provided with corresponding openings, and means for turning the rotary plate to regulate the light and to enable a room to be darkened, substantially as described.

In testimony that I claim the foregoing as my own I have hereto affixed my signature in the presence of two witnesses.

JESSE A. ASHBURN.

Witnesses:
 THOMAS W. FOLGER,
 RUSH G. FOLGER.